United States Patent
Buer et al.

(10) Patent No.: US 8,411,867 B2
(45) Date of Patent: Apr. 2, 2013

(54) SCALABLE AND SECURE KEY MANAGEMENT FOR CRYPTOGRAPHIC DATA PROCESSING

(75) Inventors: Mark Buer, Payson, AZ (US); Zheng Qi, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 595 days.

(21) Appl. No.: 12/418,967

(22) Filed: Apr. 6, 2009

(65) Prior Publication Data

US 2010/0254537 A1 Oct. 7, 2010

(51) Int. Cl.
*H04L 9/08* (2006.01)
*G06F 21/00* (2006.01)

(52) U.S. Cl. .............................. 380/279; 726/7; 713/168

(58) Field of Classification Search .................. None
See application file for complete search history.

(56) References Cited

U.S. PATENT DOCUMENTS

| | | | |
|---|---|---|---|
| 2002/0087860 A1* | 7/2002 | Kravitz | 713/168 |
| 2004/0005061 A1* | 1/2004 | Buer et al. | 380/282 |
| 2007/0294541 A1* | 12/2007 | Avadhanam | 713/189 |
| 2008/0219449 A1* | 9/2008 | Ball et al. | 380/277 |

* cited by examiner

*Primary Examiner* — Fikremariam A Yalew
(74) *Attorney, Agent, or Firm* — Sterne, Kessler, Goldstein & Fox, P.L.L.C.

(57) ABSTRACT

A method and system for secure and scalable key management for cryptographic processing of data is described herein. In the method, a General Purpose Cryptographic Engine (GPE) receives key material via a secure channel from a key server and stores the received Key encryption keys (KEKs) and/or plain text keys in a secure key cache. When a request is received from a host to cryptographically process a block of data, the requesting entity is authenticated using an authentication tag included in the request. The GPE retrieves a plaintext key or generate a plaintext using a KEK if the authentication is successful, cryptographically processes the data using the plaintext key and transmits the processed data. The system includes a key server that securely provides encrypted keys and/or key handles to a host and key encryption keys and/or plaintext keys to the GPE.

18 Claims, 16 Drawing Sheets

US 8,411,867 B2

SCALABLE AND SECURE KEY MANAGEMENT FOR CRYPTOGRAPHIC DATA PROCESSING

BACKGROUND OF THE INVENTION

1. Field of the Invention

This invention generally relates to key management for cryptographic data processing.

2. Background Art

Encryption of data prevents access to the data by unauthorized entities. Sensitive data such as bank account numbers, credit card numbers, social security identification, home address and phone numbers is increasingly being stored on computer systems and transported across networks. One technique to secure this information from unauthorized disclosure is encrypting the data prior to storage and/or transport.

Data is encrypted using an encryption key. Often these keys are stored in the clear (i.e. in their "plaintext" form). These unencrypted keys are referred to as "plaintext keys" herein. Because of the value of the encryption keys, the keys themselves often become targets for hackers. Therefore, keys are often encrypted prior to storage or transport to form an encrypted key. The key used to encrypt and decrypt cryptographic keys is referred to as a Key Encryption Key (KEK). Encrypting the plaintext key provides another layer of security since a hacker cannot use the encrypted key without the corresponding key encryption key.

In a typical system, data encryption processing is done either via host cryptographic processing software or an independent cryptographic accelerator. The host system might have a secure key storage area such as a Trusted Platfor Module (TPM) or a Smartcard to protect the plaintext key or KEK. However, when the KEK or plaintext key are being used, they need to be transferred to the host system or the crypto-acceleration hardware. This often leaves a copy of the plaintext key material in unprotected host memory. A very common attack is to search the host memory and find the key material.

An unauthorized user having the plaintext key will be able to decrypt any data encrypted using the plaintext key. This will potentially compromise any sensitive data encrypted using the compromised key. Hence, it is important to protect the key that is used to encrypt or decrypt data, particularly sensitive individual, corporate or government data. Conventional methods to provide a secure key management infrastructure usually have the plaintext keys or both the encrypted keys and the key encryption keys on the host system. However, if the host stores plaintext keys and is vulnerable to an attack, then a hacker can access the plaintext keys to cryptographically process sensitive data. Also, if the host stores both the encrypted key and the associated key encryption key then a hacker can use the key encryption key to decrypt the encrypted key and generate a plaintext key to cryptographically process sensitive data. Accordingly, a secure key management system and method are required to overcome these deficiencies.

BRIEF DESCRIPTION OF THE FIGURES

The accompanying drawings, which are included to provide a further understanding of the invention and are incorporated in and constitute a part of this specification, illustrate embodiments of the invention and together with the description serve to explain the principles of the invention. In the drawings.

The present invention will now be described with reference to the accompanying drawings. In the drawings, like reference numbers may indicate identical or functionally similar elements.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The present invention will be described in terms of an embodiment applicable to secure and scalable key management for cryptographic processing of data. It will be understood that the essential concepts disclosed herein are applicable to a wide range of cryptographic standards, electronic systems, architectures and hardware elements. Based on the description herein, a person skilled in the relevant art(s) will understand that the invention can be applied to other applications and a wide variety of cryptographic standards.

Figure 1A:
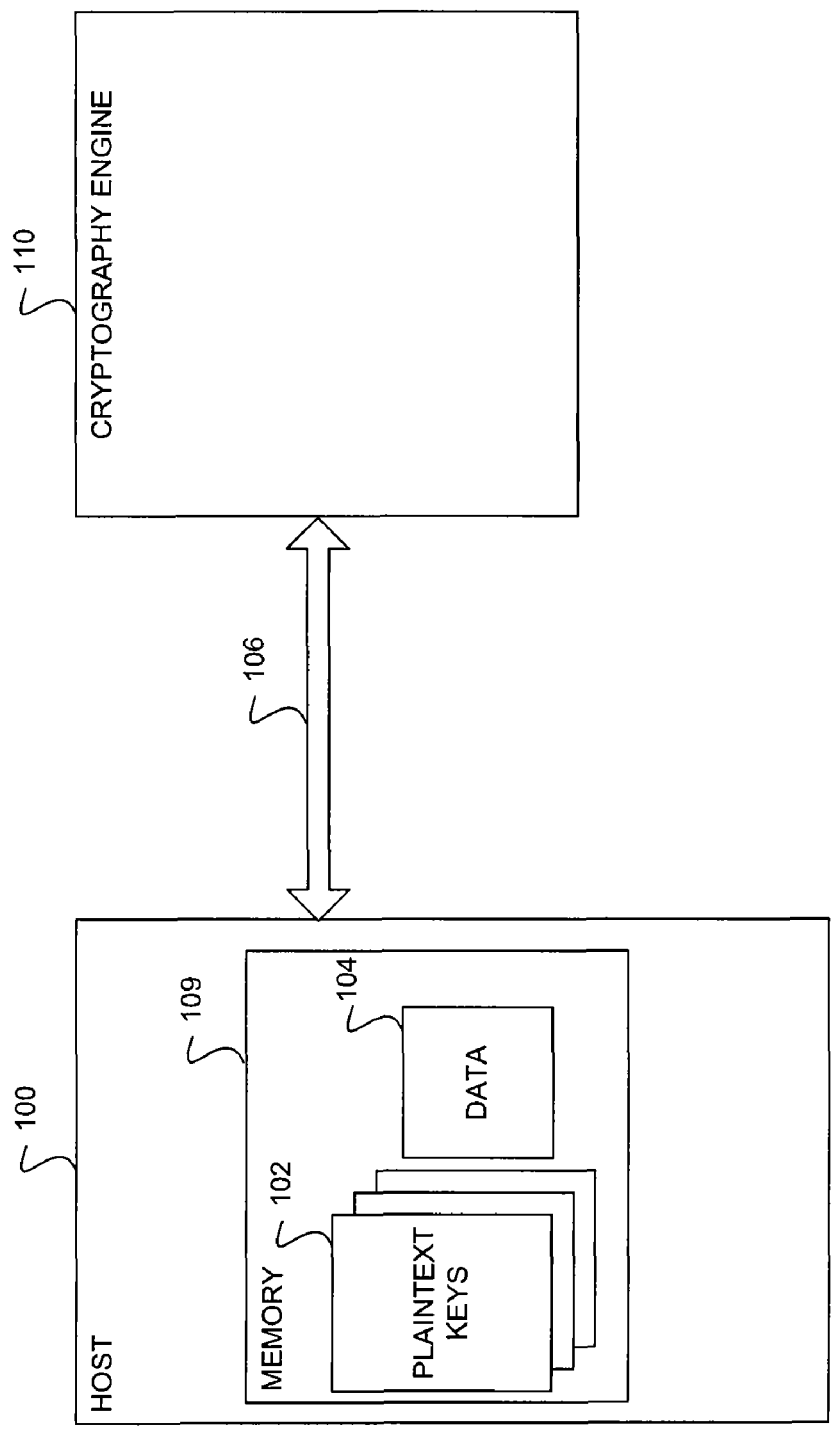
FIGS. 1A-B illustrate conventional key distribution and cryptographic processing of data.
Figure 1B:
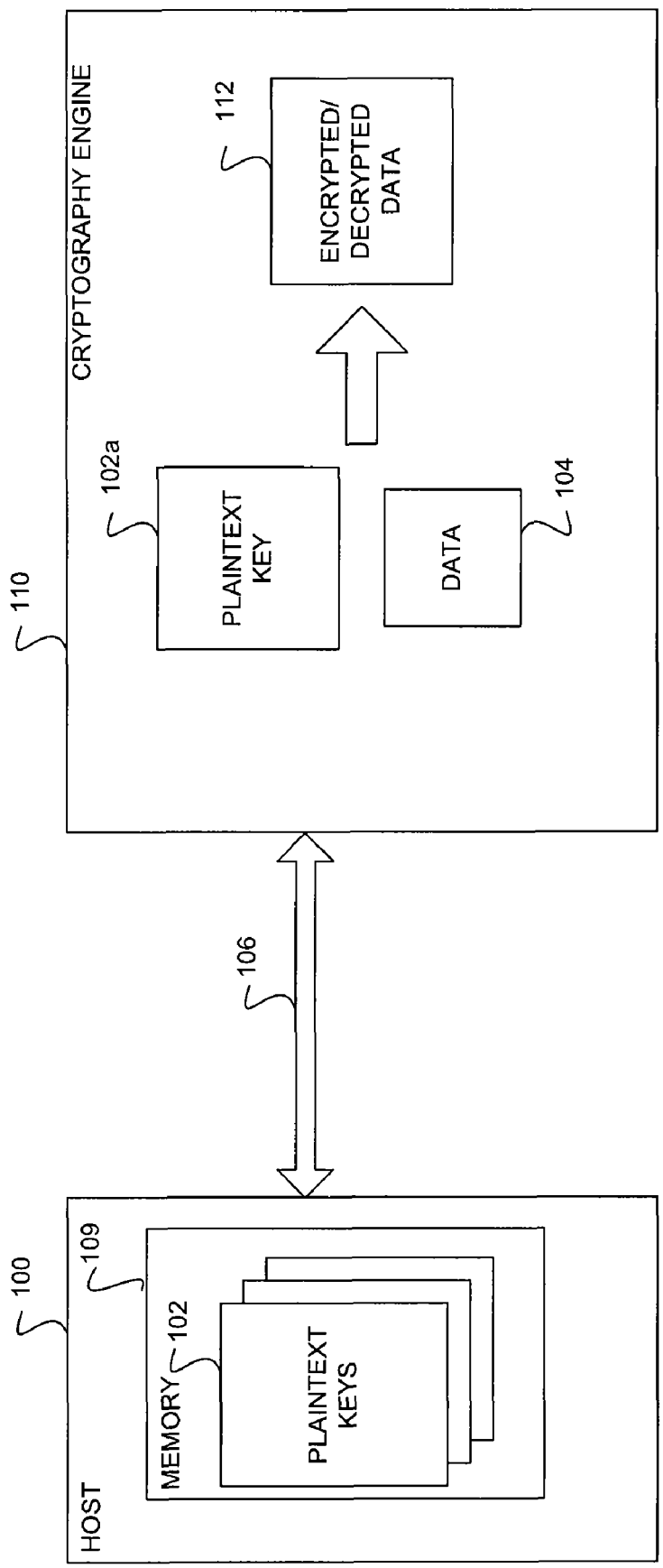

FIGS. 1A-B illustrates a block diagram of a conventional system for key distribution and cryptographic processing of data. The system of FIGS. 1A-B includes a cryptographic engine 110, bus 106 and a host 100. Cryptography engine 110 is coupled to host 100 via bus 106.

As shown in FIG. 1A, host 100 stores multiple cryptographic keys 102 in plaintext format (unencrypted keys are referred to as "plaintext keys" throughout) along with data 104 that is to be cryptographically processed (e.g. encrypted or decrypted). As shown in FIG. 1B, host 100 is configured to communicate a plaintext key 102a from the plurality of plaintext keys 102 along with data 104 to cryptography engine 110 via bus 106. Cryptography engine 110 is configured to cryptographically process data 104 using plaintext key 102a and generate processed data 112 that is communicated back to host 100 via bus 106. However, in the conventional key distribution shown in FIGS. 1A-B, host 100 stores the cryptographic keys as plaintext keys 102. Storing the keys 102 in plaintext renders the keys vulnerable to unauthorized access if security of host 100 is compromised. Embodiments presented herein provide secure and scalable key management to limit the accessibility to plaintext keys.

Figure 2A:
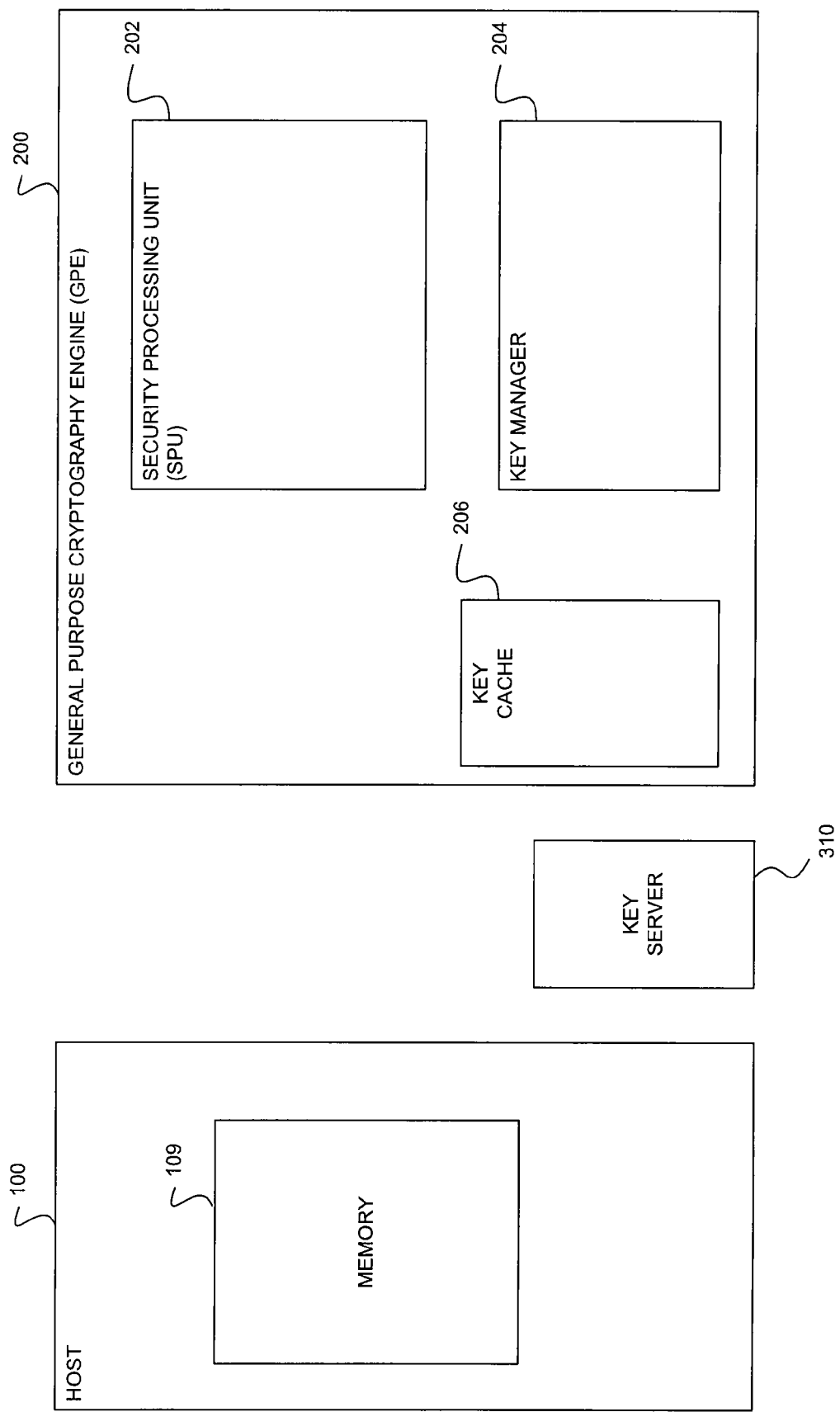
FIG. 2A illustrates an example operating environment according to an embodiment of the invention.

FIG. 2A illustrates components of an example operating environment for secure key management according to an embodiment of the invention. The operating environment in FIG. 2A includes host 100 with memory 109, key server 310 and general purpose cryptography engine (GPE) 200. General purpose cryptography engine 200 includes a security processing unit 202, a key manager 204 and key cache 206.

Security processing unit 202 is an cryptographic engine configured to cryptographically process data. Security processing unit 202 may use any cryptographic algorithm, including, but not limited to Advanced Encryption Standard (AES), Data Encryption Standard (DES), Secure Hash Algorithm-1 (SHA 1) or Secure Hash Algorithm-2 (SHA 2). Security processing unit 202 will be described further in embodiments presented below.

Key manager 204 is configured to store and manage cryptographic keys as well as enforce security policies. For example, key manager 204 may authenticate software process(es) on host 100 that request cryptographically process data from GPE 200. In an embodiment, key manager 204 authenticates host 100 for every block of data that is to be cryptographically processed using an authentication tag. The authentication tag used to authenticate a process on host 100 may be a static password or a dynamic one time password (OTP) or a shared secret that is static or rolling and is a predefined length (e.g., 64-bits). The dynamic construction of the authentication tag presents a rogue application running on a compromised system to tamper or attack cryptographic keys used by another trusted application. This is a stronger authentication mechanism than the static password-based authentication. This is because the authentication tag changes every time the key material is being used.

In an embodiment, authentication tag is implemented by encrypting key handle 300 using a 64-bit shared secret between host 100 and GPE 200. The shared secret may be established between the host 100 and firmware running on processor 236 of GPE 200 using the out-of-band authentication method. Once the secret is established, GPE 200 installs the shared secret into key manager 204. The key manager 204 is configured to decrypt key handle 300 before using an index in the key handle to reference a plaintext key 102 or a KEK 304 stored in key cache 206. The encryption may be a simple XOR function. In an embodiment, multiple shared secrets may be used between host 100 and GPE 200.

In another embodiment, the authentication tag is implemented as a One Time Password (OTP). An OTP may be associated with each KEK 304 or plaintext key 102 in key cache 206. For example, a 32-bit OTP may be embedded in key handle 300 as well as stored in a table entry of key cache 206. The OTP from host 100 is compared to the OTP in key cache 206 to authorize release of an associated KEK or plaintext key. The OTP may then be incremented to a next value and stored back into key cache 206 for the next reference.

It is to be appreciated by a person of skill in the art that alternate authentication tags or procedures may be used.

In an embodiment, key manager 204 is configured to reference a plaintext key from key cache 206 using an index received from host 100 and provide the plaintext key to security processing unit 202 for cryptographically processing data. In another embodiment, key manager 204 is configured to reference a key encryption key (KEK) based on an index received from host 100 and decrypt a encrypted key received from host 100 to generate a plaintext key. Key manager 204 will be described further in embodiments presented below.

In an embodiment, key cache 206 is configured to store plaintext keys received from key server 310 (FIG. 3A-D). The plaintext keys may be received under a secure key management protocol. In another embodiment, key cache 206 provides a scalable key management by storing key encryption keys received from key server 310 (FIGS. 4A-D). Key cache 206 may be a secure key cache in that it may only be accessible by processes internal to general purpose cryptographic engine 200. The key encryption keys may be received from key server 310 under a secure key management protocol. The secure key management protocol is implemented in embedded software running on processor 236. Therefore the host 100 is not involved in any key management step.

According to an embodiment of the invention, host 100 is configured to store a key handle, encrypted keys and data to be processed in memory 109. In embodiment, key server 310 serves the encrypted keys, the authentication tag, and/or the index to the host. A key handle may include, an authentication tag and an index. As described above, the authentication tag may be used by the key manager to authenticate the host 100. The authentication tag associates the usage of a particular key with an application or a user so that keys stored in the key cache 206 are not arbitrarily accessed. The authentication tag remotely assigned by the server 318 when the keys are transferred or created. It can also be dynamically assigned by requiring applications to locally authenticate to GPE 200. This is equivalent to having the applications register a secure session with GPE 200. The index in the key handle may be used by general purpose engine 200 to reference a key encryption key to decrypt a corresponding encrypted key. In this embodiment, key server 310 includes a plurality of key encryption keys which are transmitted to key cache 206 of general purpose of cryptography engine 200 via a secure channel. In this embodiment, key manager 304 is configured to generate a plaintext key from an encrypted key using the key encryption key referenced by the index in the key handle received from host 100. Security processing unit 202 is configured to use the plaintext key to cryptographically process data 104 and generate processed data 112.

In an alternate embodiment, host 100 is configured to store the key handle and the data to be processed 104. In this embodiment, key server 310 initially includes a plurality of plaintext keys 102 which are communicated to key cache 206 via a secure channel. In this embodiment, the key handle 300 again includes an authentication tag and an index. The authentication tag, as in the previous case is used to authenticate host 100. However the index in this embodiment is used to reference one of the plaintext keys from the plurality of plaintext keys 102 in key cache 206. Security processing unit 202 is configured to use the plaintext key referenced by key manager 204 to cryptographically process data 104 and generate processed data 112.

Figure 2B:
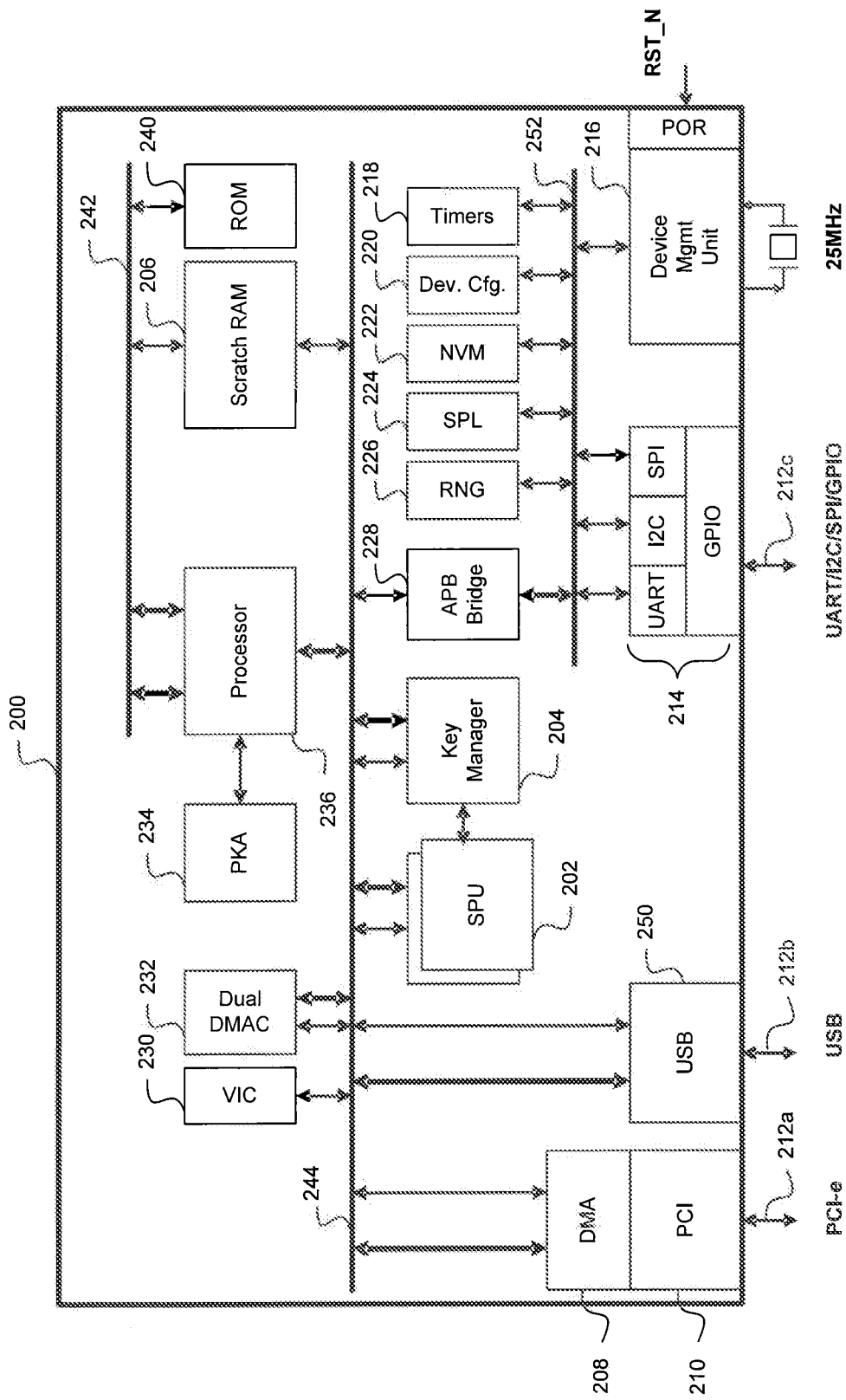
FIG. 2B illustrates an example general purpose cryptography engine according to an embodiment of the invention.

FIG. 2B illustrates a block diagram of an exemplary general purpose cryptography engine 200 according to an embodiment of the invention. General purpose cryptographic processing engine (GPE) 200 includes security processing unit 202, key manager 204 and key cache 206. General purpose cryptography engine 200 also includes a Direct Memory Access (DMA) engine 208, Peripheral Component Interconnect (PCI) interface 210, general purpose interface 214, Universal Serial Bus (USB) interface 250 and buses 212a-c that enable general purpose cryptography engine 200 to communicate with external devices such as host 100 and key server 310 (FIGS. 3 and 4). Interface 214 includes but is not limited to a Universal Asynchronous Receiver Transmitter (UART) interface, an (Inter-IC) I2C interface, a Serial Port Interface (SPI) and a general purpose input/output (GPIO) interface. Buses 212a-c include but are not limited to one or more of PCI, USB, I2C, SPI, UART, GPIO buses. It is to be appreciated that the type of interface and bus standard used by GPE 200 to communicate with external devices is a design choice and may be arbitrary.

GPE 200 may include additional or alternate elements as required by specific embodiments, for example, Dual DMAC 232, VIC 230, PKA 234, RNG 226, SPL 224, NVM 222, DevCfg 220, APB bridge 228, timers 218 and device management unit 216. In an embodiment, device management unit 216, key manager 204, random number generator 226, security protection logic 224, non-volatile memory 222, VIC unit 230, dual DMAC 232, RAM 206, timers 218, processor 236, key cache 206, device configuration unit 220 and signature engine 234 are secure devices that may be accessed only by processes internal to GPE 200. Open units may be accessed by processes external to GPE 200. In an embodiment, DMA 208, USB interface 250, security protection unit (SPU) 202, interface 214, PCI interface 210 and APB bridge 228 are open.

Direct memory access engine 208 manages data transfer between PCI interface 210 and system bus 244. PCI interface 210 provides a PCI interface to host 100 which may be coupled to GPE 200 via PCI bus 212a. USB interface 250 provides a USB interface to host 100 which may be coupled via USB bus 212b. General purpose interface 214 provides a general purpose input/output (I/O) interface to host 100 which may be coupled via bus 212c to GPE 200.

Figure 5:
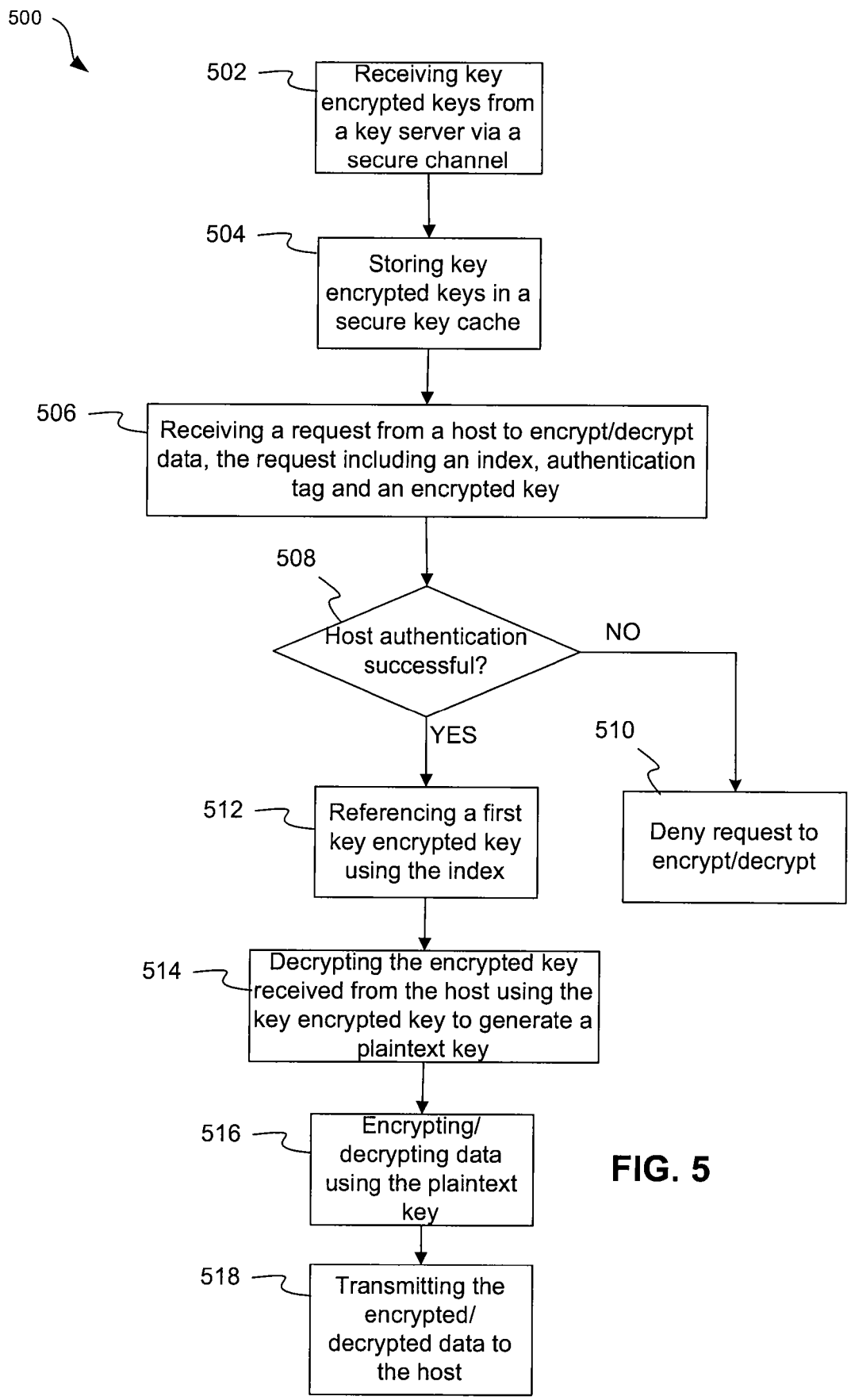
FIG. 5 depicts a flowchart of a method for secure key management and cryptographic processing of data according to an embodiment of the present invention.

FIG. 5 depicts a flowchart 500 of a method for secure key management and cryptographic processing of data according to an embodiment of the present invention. Flowchart 500 will be described with reference to the example operating environment depicted in FIGS. 3A-C. However, the flowchart is not limited to these embodiments. Note that some steps shown in flowchart 500 do not necessarily do have to occur in the order shown.

Figure 3A:
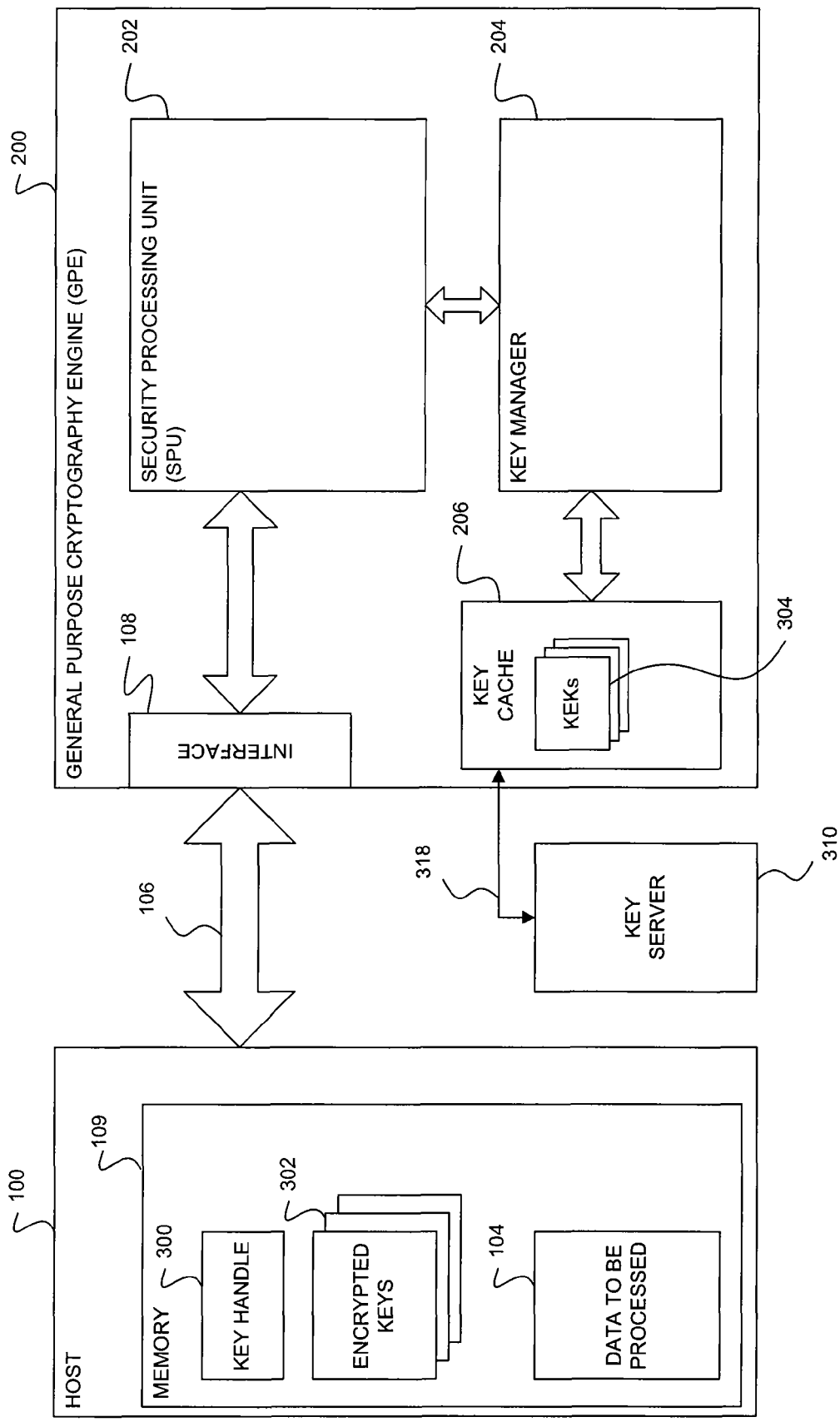
FIGS. 3A-D illustrate an exemplary system for secure key management and cryptographic processing of data according to an embodiment of the invention.
Figure 3B:
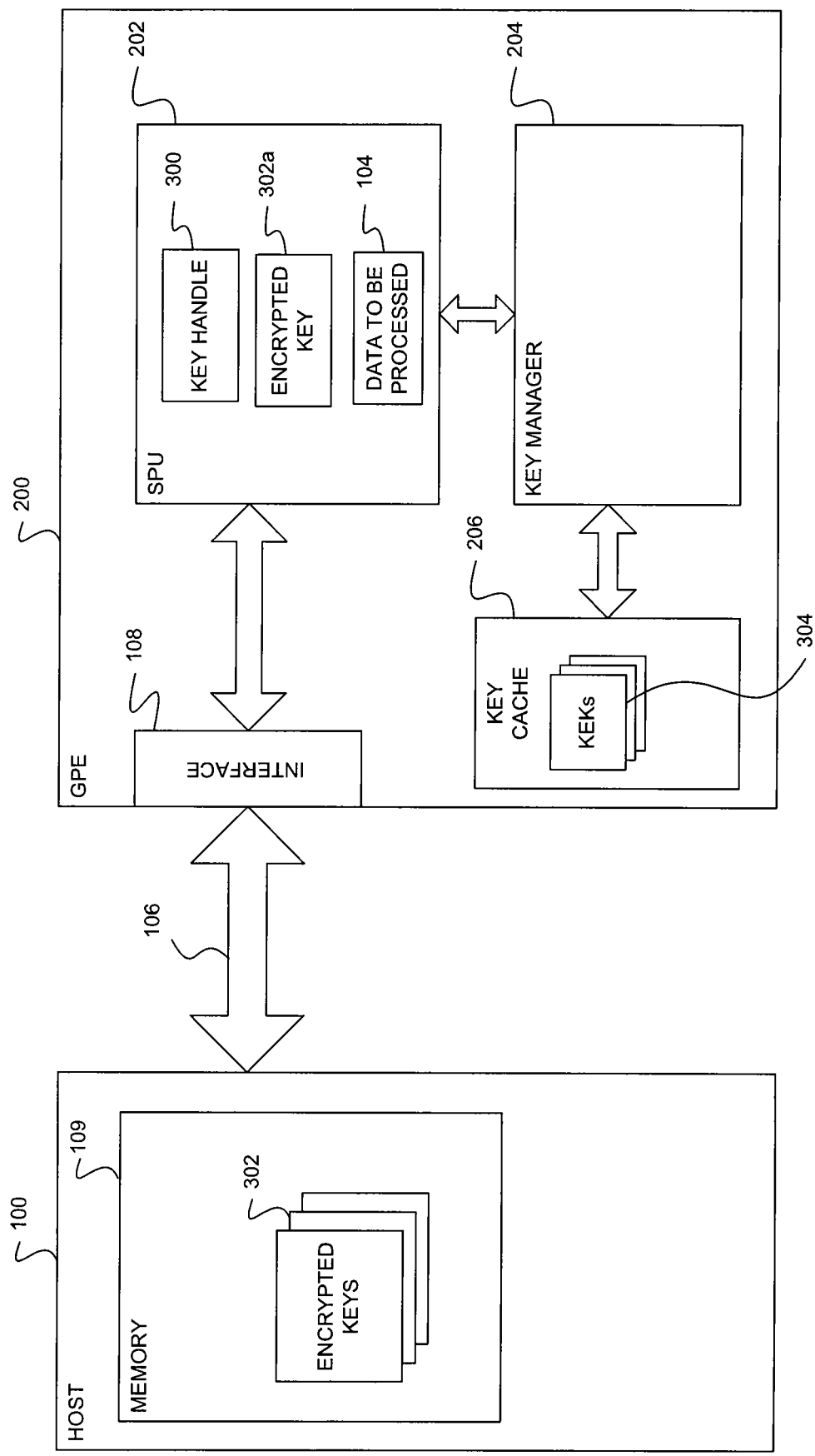
Figure 3C:
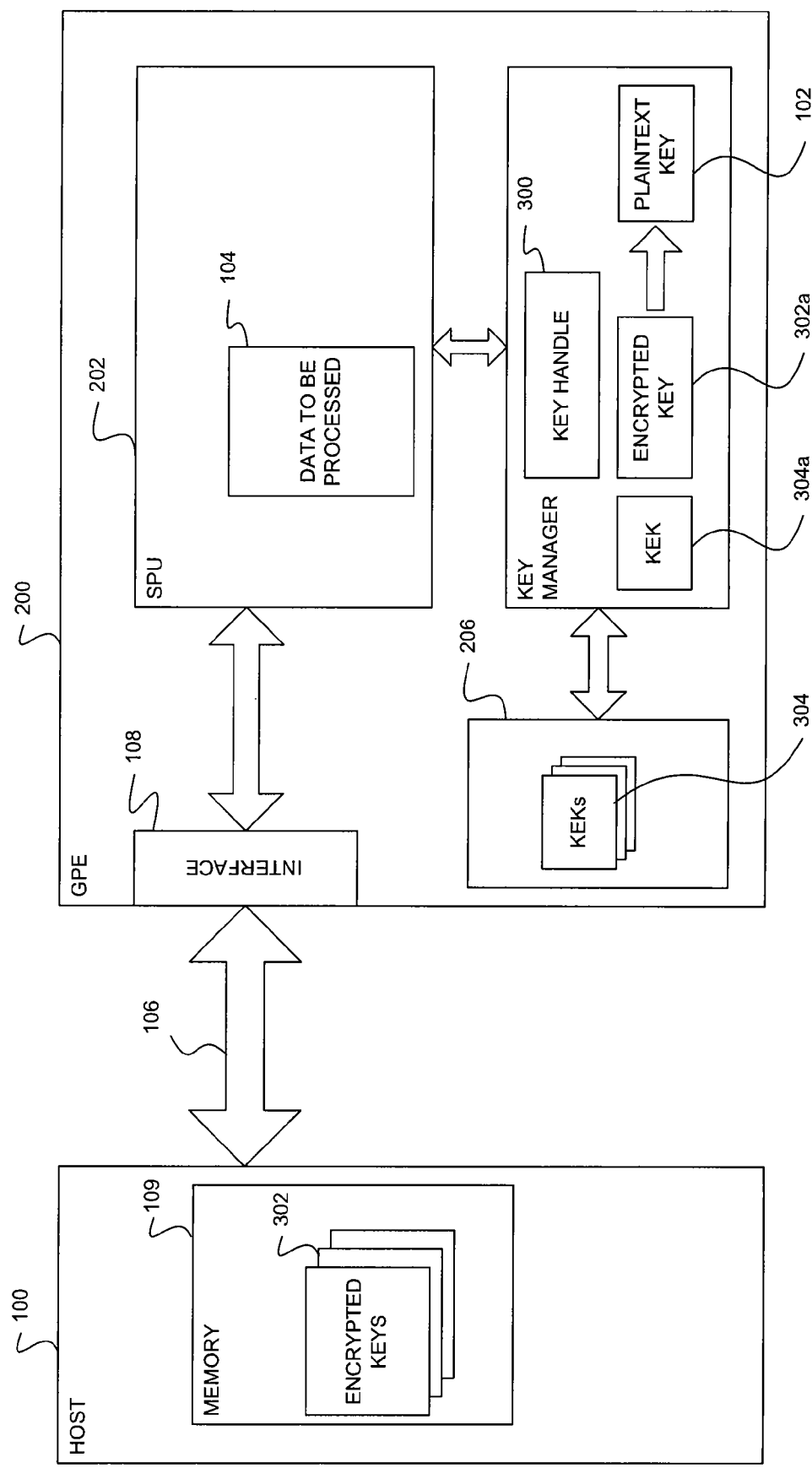

FIGS. 3A-C illustrate an exemplary system for secure key management and cryptographic processing of data according to an embodiment of the invention. Host 100 is coupled to general purpose cryptography engine 200 via bus 106 and interface 108. Bus 106 may be one of buses 212a-c and interface 108 may be one of PCI interface 210, USB 250 and GPIO 214. As shown in FIG. 3A, host 100 initially includes key handle 300, encrypted keys 302 and data to be processed 104 and key server 310 include key encryption keys 304. In embodiments, the key handles and encrypted keys are securely served to host 100 by key server 310.

In step 502, a plurality of key encryption keys are received at GPE 200 via a secure channel from key server 310. General purpose cryptography engine 200 is coupled to key server 310 via bus 318. Key encryption keys 304 may be received from key server 310 via bus 318 (see FIG. 3A). The key encryption keys may be received via a secure channel, for example, a transport layer security (TLS) protocol or a Secure Sockets Layer (SSL) protocol. The key encryption keys 304 may be received from key server 310 before data to be processed 104 is received from host 100. Key encryption keys 304 enable key manger 204 to decrypt corresponding encrypted keys 302 received from host 100 to generate plaintext keys that enable cryptographic processing of data 104 received from host 100. Host 100 does not have direct access to key server 310 or to key encryption keys 304 that are stored in key cache 206 of general purpose cryptography engine 200 thereby preventing unauthorized access from host 100 to key encryption keys 304 that are required to decrypt encrypted keys 302 and generate plaintext keys. Encrypted keys 302 without key encryption keys 302 cannot be used to encrypt or decrypt data 104. Malware or a hacker that may sabotage host 100 is unable to decrypt encrypted keys 302 since key encryption keys 304 are stored on the general purpose cryptography engine 200 and are not accessible to software running on host 100. Therefore, malicious users or code compromising host 100 will be unable to access the key encryption key preventing access to the encryption keys and underlying data.

In step 504, the key encryption keys received in step 502 are stored in secured key cache 206. Typically, encrypted keys 302 require significantly more storage space than key encryption keys 304. In system 308, encrypted keys 302 are stored on host 100 and key encryption keys 304 are stored in cache 206 of general purpose cryptographic processing engine 200. This provides a scalable model since encryption engines such as general purpose cryptography engine 200 typically do not have enough space to store all of encrypted keys 302 at once. General purpose cryptography engine 200 receives an encrypted key from host 100 as needed. Since the host stores encrypted keys 302 but cannot use the encrypted keys 302 without the key encryption keys 304 this model provides a scalable and secure method to cryptographically process data.

In step 506, a request is received from the host to encrypt or decrypt a block of data. The request includes an encrypted key and a key handle. For example, general purpose cryptography engine 200 receives a request to encrypt or decrypt data 104 from host 100 along with encrypted key 302a and key handle 300. As shown in FIG. 3B, host 100 is configured to communicate key handle 300, encrypted key 302 and data to be processed 104, to security processing unit 202 via bus 106. Key handle 300 includes an authentication tag and an index to reference a key encryption key 304a that can decrypt encrypted key 302a.

In step 508 it is determined whether the host is authenticated successfully using the tag in key handle. For example, the authentication tag in key handle 300 enables key manager 204 to authenticate host 100 prior to cryptographic processing of data 104. Authentication methods as described above include but are not limited to one time passwords or a shared secret that is static or rolling and is a predefined (64-bits) length. If host 100 is authenticated successfully then the process proceeds to step 512. For example, key manager 204 compares the received authorization tag with an authorization tag stored (or generated) for host 100. If valves match, authentication is successful. If valves do not match, authentication is not successful. If host 100 is not authenticated successfully the process proceeds to step 510.

In step 510, the request to encrypt or decrypt data is denied by the general purpose cryptographic processing engine due to authentication failure.

In step 512, a first key encryption key is referenced using the index. For example, key manager 204 references key 304a using the index in key handle 300 (see FIG. 3C). As shown in FIG. 3C, security processing unit 202 is configured to send key handle 300 and encrypted key 302a to key manager 204. Key manager 204 is configured to retrieve a key encryption key 304a using the index in key handle 300.

In step 514, the encrypted key received in step 506 is decrypted using the key encryption key referenced in step 512 so as to generate a plaintext key. For example, key manager 204 is configured to decrypt encrypted key 302a using the retrieved key encryption key 304a to generate plaintext key 102.

Figure 3D:
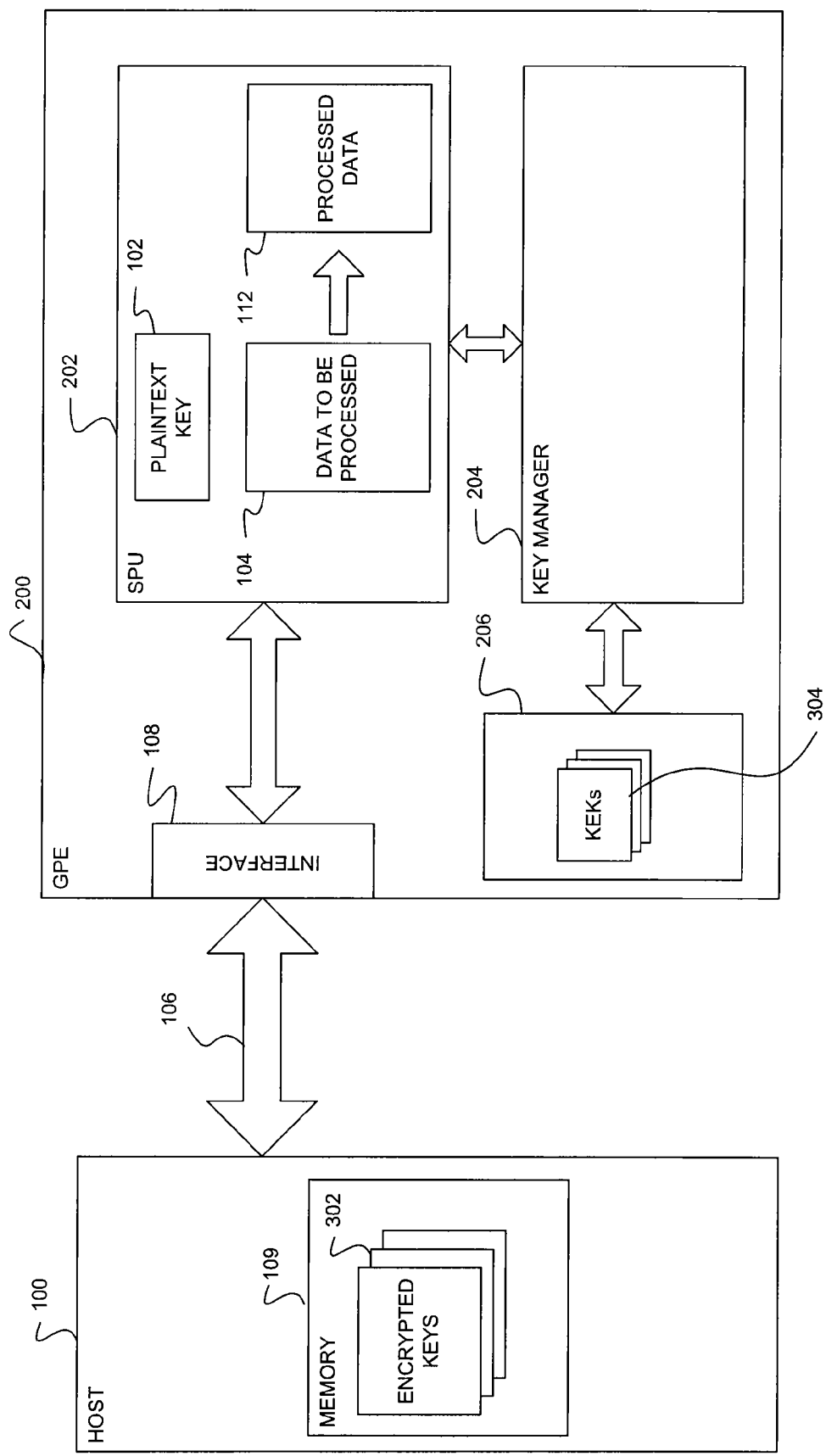

In step 516, the data received in step 506 is cryptographically processed using the plaintext key. For example, data 104 is cryptographically processed using key 102 to generate processed data 112. As shown in FIG. 3D, key manager 204 is configured to send plaintext key 102 to security processing unit 202. Security processing unit 202 is configured to process data 104 using plaintext key 102 to generate processed data 112.

In step 518, the cryptographically processed data is transferred from security processing unit to the host 100.

According to an embodiment of the invention, for each block of data 104 received from host 100, the authentication tag in associated key handle 300 is used to authenticate host 100 prior to encryption or decryption of data 104. Authentication on a per block basis ensures that host 100 has not been compromised by malware or hackers. It is to be appreciated that authentication may occur on a per block basis or on any other size of data (e.g per megabyte) as dictated by design requirements.

Figure 6:
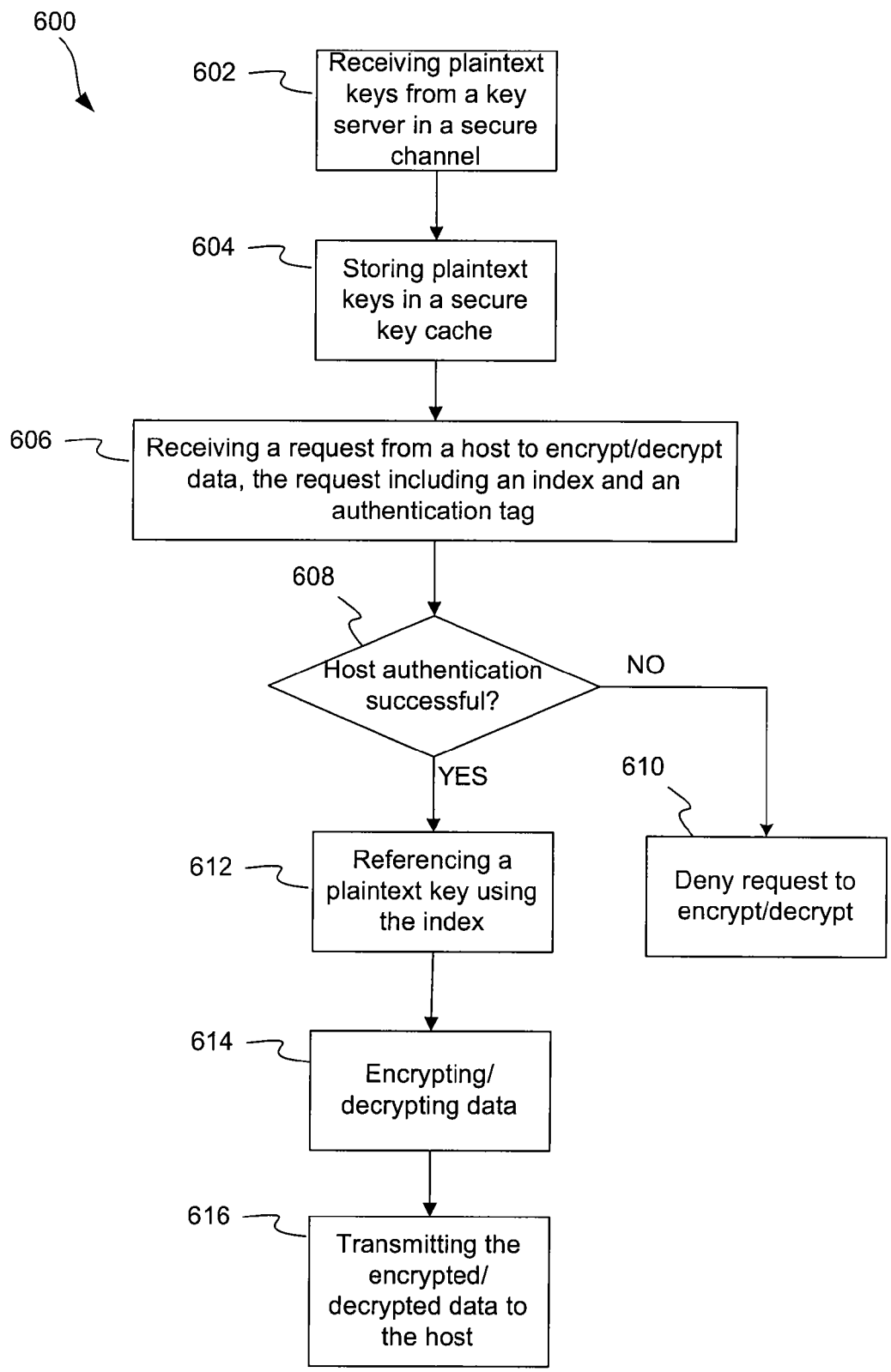
FIG. 6 depicts a flowchart of a method for secure and scalable key management and cryptographic processing of data according to an embodiment of the invention.

FIG. 6 depicts a flowchart 600 of a method for secure and scalable key management and cryptographic processing of data according to an embodiment of the invention. Flowchart 600 will be described with continued reference to the example operating environment depicted in FIGS. 4A-D. However, the flowchart is not limited to these embodiments. Note that some steps shown in flowchart 600 do not necessarily have to occur in the order shown.

Figure 4A:
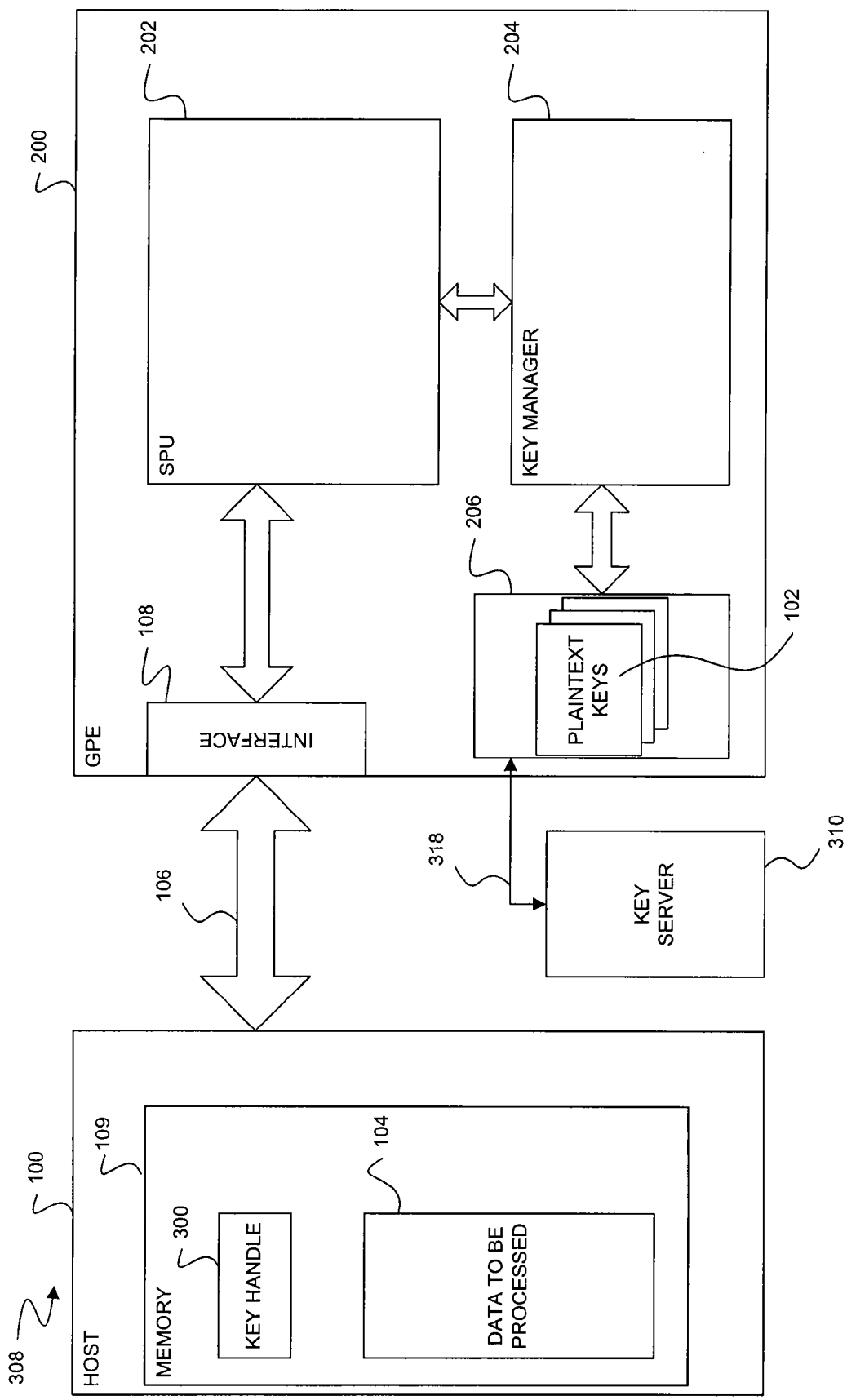
FIGS. 4A-D illustrate an exemplary system for secure and scalable key management and cryptographic processing of data according to an embodiment of the invention.
Figure 4B:
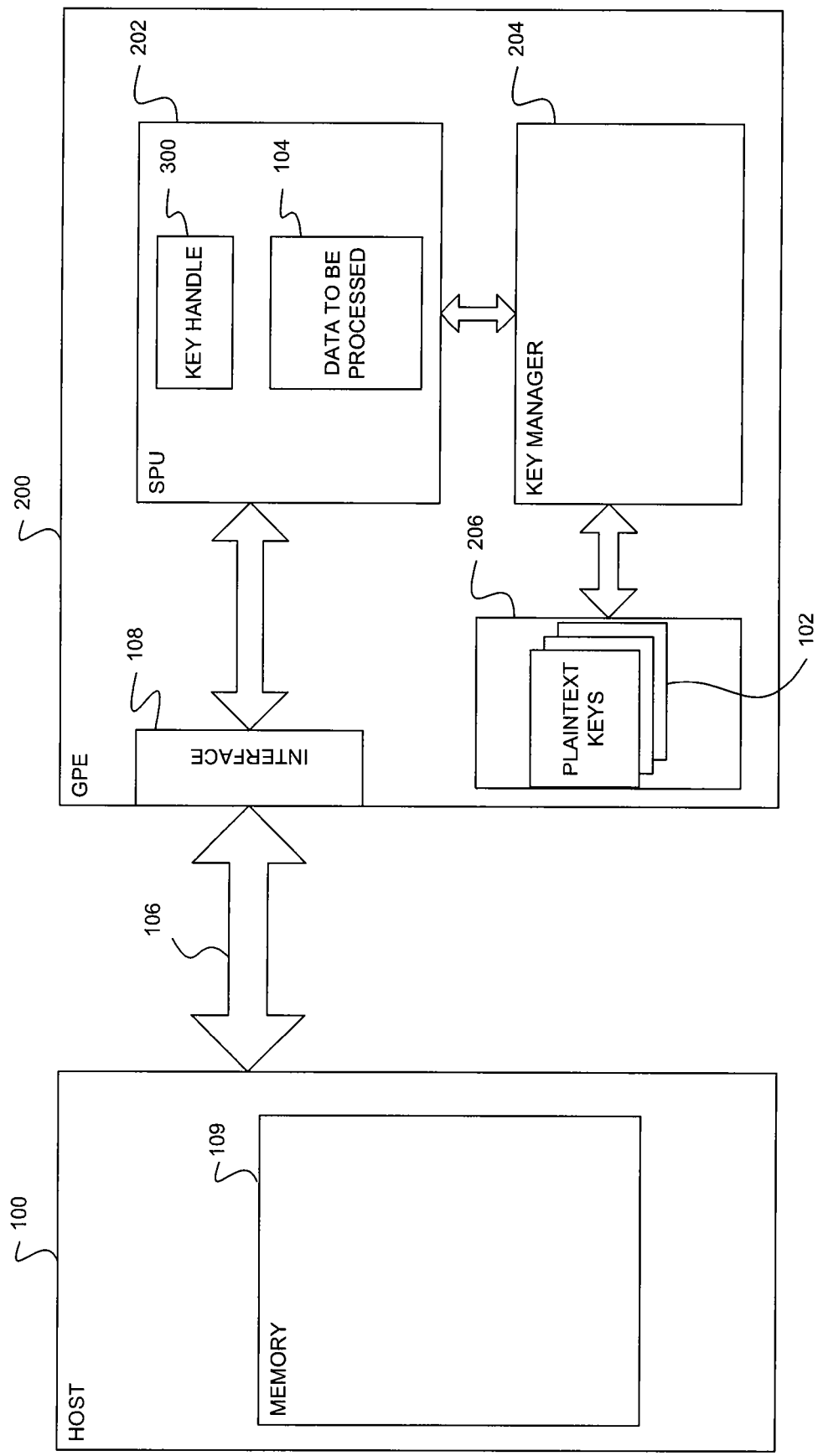

FIGS. 4A-D illustrate an exemplary system for secure and scalable key management and cryptographic processing of data according to an embodiment of the invention. As shown in FIG. 4A, host 100 initially stores key handle 300 and data to be processed 104. Host 100 is coupled to general purpose cryptography engine 200 via bus 106. Key server 310 is coupled to general purpose cryptography engine 200 via bus 318.

In step 602, multiple plaintext keys are received at GPE 200 via a secure channel from a key server. In the embodiment shown in FIGS. 4A-D, key cache 206 includes multiple plaintext keys 102 that are received from key server 310 via bus 318 via a secure channel as described above. In this embodiment, host 100 does not store and does not have access to any of plaintext keys 102. Since key server 310 communicates plaintext keys 102 to general purpose cryptography engine 200 via a secure channel (for example, via a transport layer security protocol) and since key server 310 is not associated with or coupled to host 100, any malware or hacker that compromises host 100 will not have access to plaintext keys 102.

In step 604, the plaintext keys received in step 602 are stored in secure key cache 200. Secure key cache 206 may be accessible only by processes internal to general purpose cryptography engine 200 thereby adding another layer of security.

In step 606, a request is received from a host to cryptographically process a block of data along with a key handle. The key handle includes an authentication tag and an index. For example, general purpose cryptography engine 200 may receive a request from host 100 to cryptographically process data 104 along with key handle 300 (see FIG. 4B). In this embodiment, key handle 300 includes an authentication tag and an index. The index enables key manager 204 to reference a plaintext key 102a from multiple plaintext keys 102 stored in key cache 206. Key 102a enables security processing unit 204 to cryptographically process data 104.

Figure 4C:
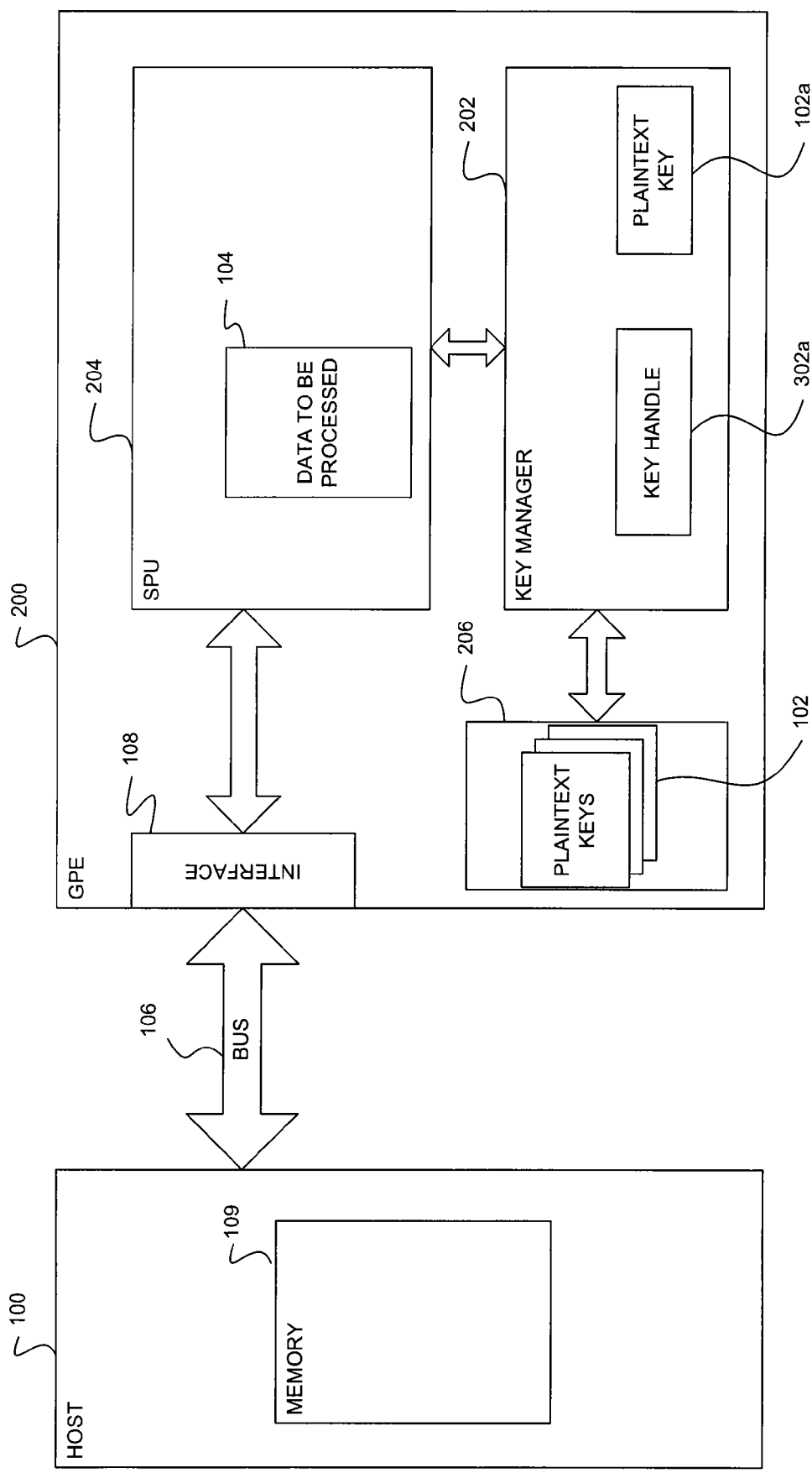

In step 608, host 100 is authenticated. For example, key cache manager 204 authenticates host 100 using the authentication tag in key handle 300. As shown in FIG. 4C, security processing unit 204 is configured to transmit key handle 300 to key manager 204. Key manager 202 is configured to authenticate host 100 using the authentication tag in key handle 300 as described above. Authentication of host 100 is performed prior to encryption or decryption of data 104. If it is determined, that the host 100 is successfully authenticated then the process proceeds to step 612. If it is determined, that host authentication is unsuccessful, then the process proceeds to step 610.

In step 610, the request to cryptographically process data received in step 606 is denied. For example, general purpose cryptography engine 200 denies the request of host 100 to cryptographically process data 104.

In step 612, a plaintext key is referenced and retrieved using the index in the key handle. For example, if authentication of host 100 is successful, key manager 202 is configured to reference and retrieve plaintext key 102a in key cache 206 using the index in key handle 300 (see FIG. 4C).

Figure 4D:
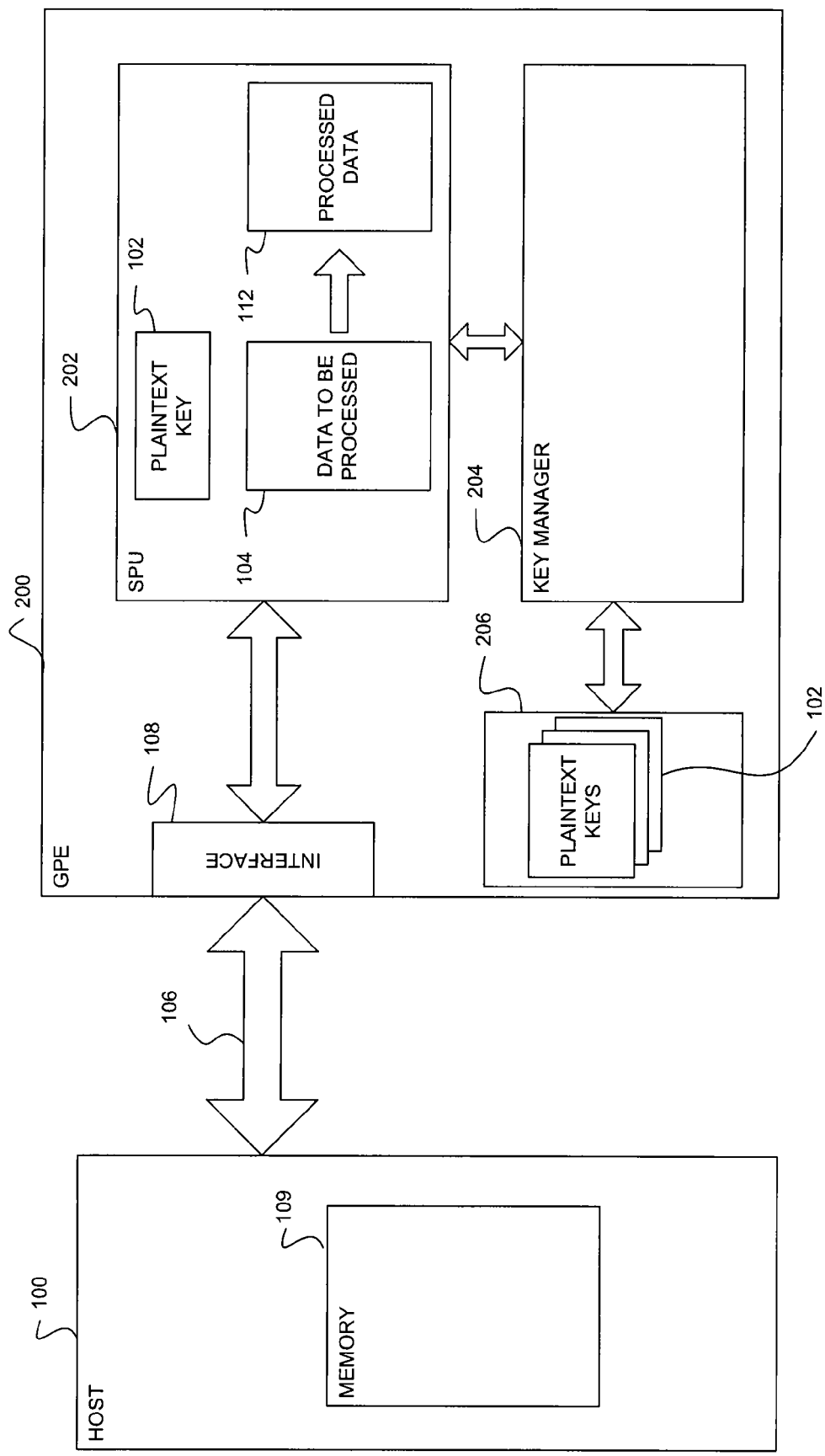

In step 614, data received in step 606 is cryptographically processed using the key retrieved in step 612. As shown in FIG. 4D, key manager 204 is configured to send retrieved plaintext key 102a to security processing unit 202. Security processing unit 202 is configured to use plaintext key 102a to cryptographically process data 104 and generate processed data 112. Security processing unit 202 encrypts or decrypts data 104 based on the request received from host 100.

In step 616, the cryptographically processed data is transmitted back to the host. For example, security processing unit 202 transmits processed data 112 back to host 100.

Example General Purpose Computer System

The present invention, or portions thereof, can be implemented in hardware, firmware, software, and/or combinations thereof.

Figure 7:
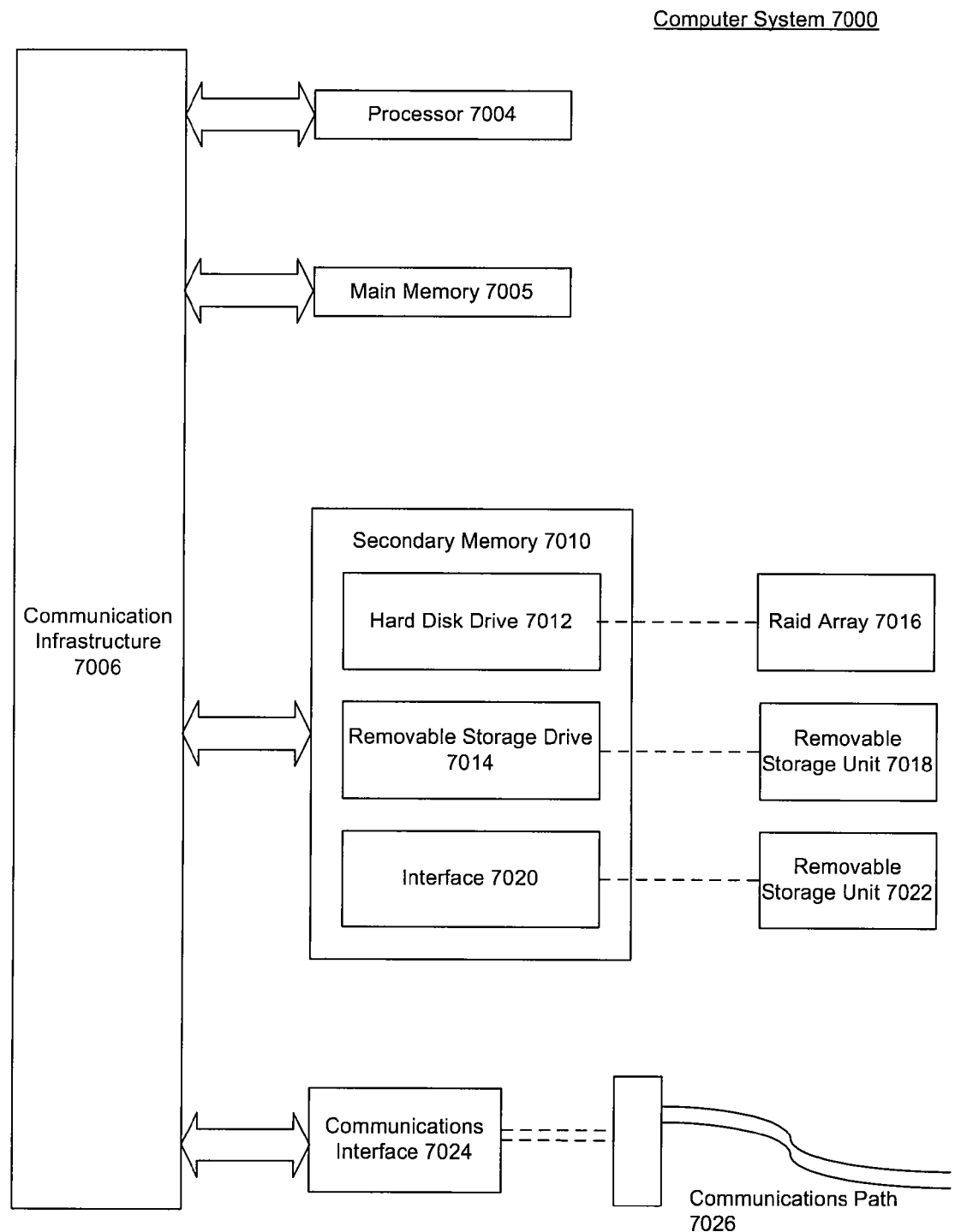
FIG. 7 is a block diagram of an exemplary computer system on which the present invention can be implemented.

The following description of a general purpose computer system is provided for completeness. The present invention can be implemented in hardware, or as a combination of software and hardware. Consequently, the invention may be implemented in the environment of a computer system or other processing system. An example of such a computer system 7000 is shown in FIG. 7. The computer system 7000 includes one or more processors, such as processor 7004. Processor 7004 can be a special purpose or a general purpose digital signal processor. The processor 7004 is connected to a communication infrastructure 7006 (for example, a bus or network). Various software implementations are described in terms of this exemplary computer system. After reading this description, it will become apparent to a person skilled in the relevant art how to implement the invention using other computer systems and/or computer architectures.

Computer system 7000 also includes a main memory 7005, preferably random access memory (RAM), and may also include a secondary memory 7010. The secondary memory 7010 may include, for example, a hard disk drive 7012, and/or a RAID array 7016, and/or a removable storage drive 7014, representing a floppy disk drive, a magnetic tape drive, an optical disk drive, etc. The removable storage drive 714 reads from and/or writes to a removable storage unit 7018 in a well known manner. Removable storage unit 7018, represents a floppy disk, magnetic tape, optical disk, etc. As will be appreciated, the removable storage unit 7018 includes a computer usable storage medium having stored therein computer software and/or data.

In alternative implementations, secondary memory 7010 may include other similar means for allowing computer programs or other instructions to be loaded into computer system 7000. Such means may include, for example, a removable storage unit 7022 and an interface 7020. Examples of such means may include a program cartridge and cartridge interface (such as that found in video game devices), a removable memory chip (such as an EPROM, or PROM) and associated socket, and other removable storage units 7022 and interfaces 7020 which allow software and data to be transferred from the removable storage unit 7022 to computer system 7000.

Computer system 7000 may also include a communications interface 7024. Communications interface 7024 allows software and data to be transferred between computer system 7000 and external devices. Examples of communications interface 7024 may include a modem, a network interface (such as an Ethernet card), a communications port, a PCM-CIA slot and card, etc. Communications path 7026 may be implemented using wire or cable, fiber optics, a phone line, a cellular phone link, an RF link and other communications channels.

The terms "computer program medium" and "computer usable medium" are used herein to generally refer to media such as removable storage drive 7014, a hard disk installed in hard disk drive 7012. These computer program products are means for providing software to computer system 7000.

Computer programs (also called computer control logic) are stored in main memory 7008 and/or secondary memory 7010. Computer programs may also be received via communications interface 7024. Such computer programs, when executed, enable the computer system 7000 to implement the present invention as discussed herein. In particular, the computer programs, when executed, enable the processor 7004 to implement the processes of the present invention. Where the invention is implemented using software, the software may be stored in a computer program product and loaded into computer system 7000 using raid array 7016, removable storage drive 7014, hard drive 7012 or communications interface 7024.

Example System on Chip

Figure 8:
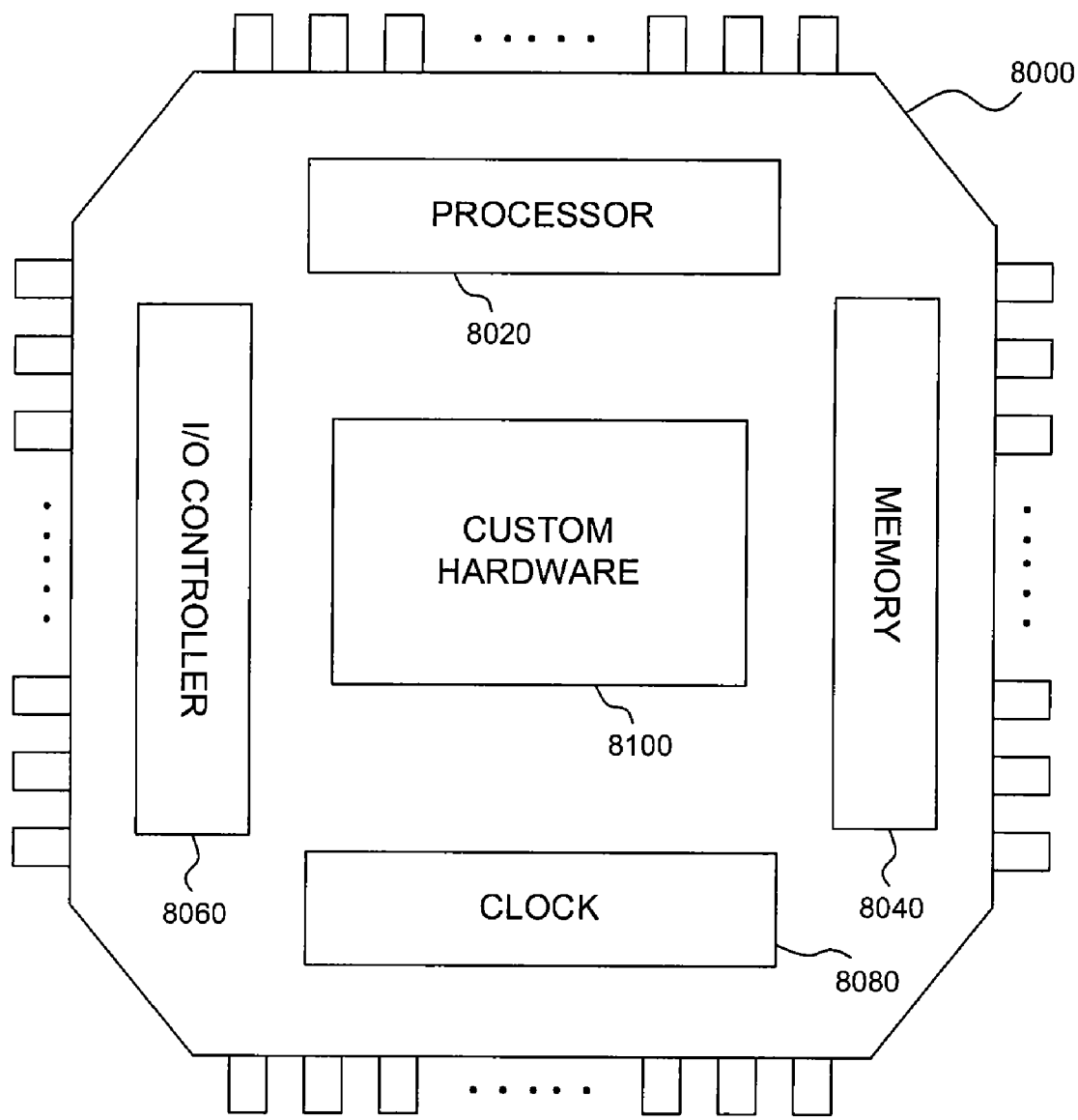
FIG. 8 is a diagram of an example System on Chip (SOC) according to an embodiment of the present invention.

FIG. 8 is a diagram of an example System on Chip (SOC) 8000 according to an embodiment of the present invention. System 8000 includes a processor 8020, a memory 8040, an input/output (I/O) controller 8060, a clock 8080, and custom hardware 8100. In an embodiment, system 8000 is in an application specific integrated circuit (ASIC). System 8000 may include hardwired circuitry or a Digital Signal Processing core in the form of custom hardware 8100 to implement functions of decoder 4014.

Processor 8020 is any processor, for example processor 8004 above, that includes features of the present invention described herein and/or implements a method embodiment of the present invention. For example, processor 8020 may be configured to implement steps in the flowcharts of FIG. 5 and FIG. 6.

Memory 8040 can be any memory capable of storing instructions and/or data. Memory 8040 can include, for example, random access memory and/or read-only memory. Memory 8040 may be secure key cache 206 configured to store plaint text keys 102 or key encryption keys 304.

Input/output (I/O) controller 8060 is used to enable components of system 8000 to receive and/or send information to peripheral devices. I/O controller 8060 can include, for example, an analog-to-digital converter and/or a digital-to-analog converter. For example, I/O controller 8060 may includes I/O interface 108.

Clock 8080 is used to determine when sequential subsystems of system 800 change state. For example, each time a clock signal of clock 8080 ticks, state registers of system 8000 capture signals generated by combinatorial logic. In an embodiment, the clock signal of clock 8080 can be varied. The clock signal can also be divided, for example, before it is provided to selected components of system 8000.

Custom hardware 8100 is any hardware added to system 8000 to tailor system 8000 to a specific application. In an embodiment, custom hardware 8100 includes one or more portions of general purpose cryptographic processing engine 200. For example, custom hardware 8100 may includes secure processing unit 202 and key manager 204. Persons skilled in the relevant arts will understand how to implement custom hardware 8100 to tailor system 8000 to a specific application.

In another embodiment, features of the invention are implemented primarily in hardware using, for example, hardware components such as Application Specific Integrated Circuits (ASICs) and gate arrays. Implementation of a hardware state machine so as to perform the functions described herein will also be apparent to persons skilled in the relevant art(s).

IV. Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A method of secure key handling and cryptographic processing of data, comprising:
   receiving a request in a cryptography engine from an entity to cryptographically process a block of data, the request including a key handle, wherein the key handle includes an authentication tag and an index;
   authenticating the requesting entity using the authentication tag;
   referencing a plaintext key from a plurality of plaintext keys using the index if the requesting entity is authenticated successfully;
   cryptographically processing the block of data using the plaintext key; and
   transmitting the processed data.

2. The method of claim 1, wherein authenticating further comprises using a shared secret to authenticate the requesting entity.

3. The method of claim 1, wherein authenticating further comprises using a one time password to authenticate the requesting entity.

4. The method of claim 1, further comprising, prior to receiving a request to cryptographically process data, receiving the plurality of plaintext keys via a secure communications channel from a key server.

5. The method of claim 4, further comprising storing the received plaintext keys in a secure key cache.

6. A method of secure and scalable key management and cryptographic processing of data, comprising:
   receiving a request in a cryptography engine from an entity to cryptographically process a block of data, the request including an encrypted key and an associated key handle, wherein the key handle includes an authentication tag and an index;

authenticating the requesting entity using the authentication tag;

referencing a first key encryption key from a plurality of stored key encryption keys using the index if the requesting entity is authenticated successfully;

decrypting the encrypted key using the first key encryption key to generate a plaintext key;

cryptographically processing the block of data using the plaintext key; and transmitting the encrypted or decrypted data to the requesting entity.

7. The method of claim 6, wherein authenticating further comprises using a shared secret to authenticate the requesting entity.

8. The method of claim 6, wherein authenticating further comprises using a one time password to authenticate the requesting entity.

9. The method of claim 6, further comprising, prior to receiving a request to cryptographically process data, receiving a plurality of key encryption keys (KEKs) via a secure channel from a key server and storing the key encryption keys in a secure key cache.

10. The method of claim 9, further comprising receiving the plurality of key encryption keys using a key management protocol.

11. A general purpose cryptographic engine (GPE) for secure key management and cryptographic processing of data, comprising:

a secure memory configured to store a plurality of plaintext keys;

a security processing unit configured to receive a request from a requesting entity to cryptographically process a block of data, the request including a key handle, wherein the key handle includes an authentication tag and an index that enables retrieval of a plaintext key from the secure memory; and a key manager coupled to the security processing unit and configured to authenticate the requesting entity based on the authentication tag and to retrieve a plaintext key based on the index if the host is authenticated successfully;

wherein the security processing unit is further configured to cryptographically process the block of data using the retrieved plaintext key and to transmit the processed data.

12. The GPE of claim 11, wherein the GPE and the requesting entity are on the same device.

13. The GPE of claim 11, wherein the key manager is configured to authenticate the requesting entity using a shared secret.

14. The GPE of claim 11, wherein the key manager is configured to authenticate the requesting entity using a one time password.

15. A general purpose cryptographic engine (GM) for secure and scalable key management and cryptographic processing of data, comprising:

a secure memory configured to store a plurality of key encryption keys (KEKs a security processing unit coupled to the processor and configured to receive a request from a requesting entity coupled to the GPE to cryptographically process a block of data, wherein the request includes an encrypted key and a key handle, wherein the key handle includes an authentication tag and an index to enable retrieval of a key encryption key in the secure memory, the key encryption key configured to enable decryption of the encrypted key; and a key manager coupled to the security processing unit and configured to authenticate the requesting entity based on the authentication tag, to retrieve the first key encryption key based on the index if host authentication is successful and decrypt the encrypted key using the first key encryption key to generate a plaintext key;

wherein the security processing unit is configured to cryptographically process the block of data using the plaintext key to generate processed data and to transmit the processed data.

16. The GPE of claim 15, wherein the requesting entity and the GPE are on the same device.

17. The GPE of claim 15, wherein the key manager is configured to authenticate the requesting entity using a shared secret.

18. The GPE of claim 15, wherein the key manager is configured to authenticate the requesting entity using a one time password.

* * * * *

UNITED STATES PATENT AND TRADEMARK OFFICE
CERTIFICATE OF CORRECTION

PATENT NO. : 8,411,867 B2  
APPLICATION NO. : 12/418967  
DATED : April 2, 2013  
INVENTOR(S) : Mark Buer Page 1 of 1

It is certified that error appears in the above-identified patent and that said Letters Patent is hereby corrected as shown below:

Title Page, Item (57), Abstract, line 10, please replace "generate a plaintext" with --generates a plaintext--.

In the Claims:

Column 12, Line 13, please replace "(GM)" with --(GPE)--.

Column 12, Line 17, please replace "(KEKs" with --(KEKs);--.

Column 12, Line 17, please start a new paragraph before "a security processing unit.".

Signed and Sealed this  
Seventeenth Day of September, 2013

Teresa Stanek Rea  
*Deputy Director of the United States Patent and Trademark Office*